(No Model.)
E. H. BELDEN.
LUBRICATOR.
No. 355,499. Patented Jan. 4, 1887.
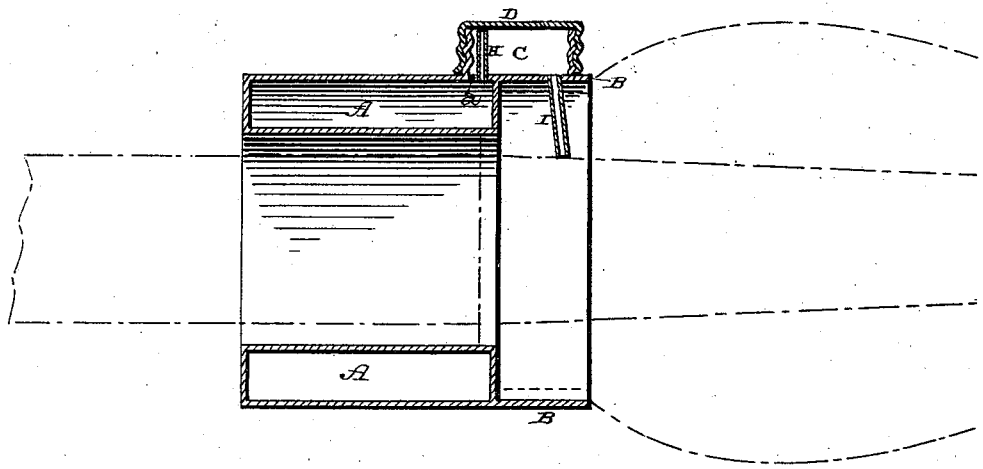
Witnesses.
L. F. Gardner
A. W. Brecht
Inventor:
E. H. Belden,
per F. A. Lehmann,
Atty.

UNITED STATES PATENT OFFICE.

EUGENE HENRY BELDEN, OF HORTON, MICHIGAN.

LUBRICATOR.

SPECIFICATION forming part of Letters Patent No. 355,499, dated January 4, 1887.

Application filed October 16, 1886. Serial No. 216,401. (No model.)

*To all whom it may concern:*

Be it known that I, EUGENE HENRY BELDEN, of Horton, in the county of Jackson and State of Michigan, have invented certain new and useful Improvements in Lubricators for Vehicles; and I do hereby declare the following to be a full, clear, and exact description of the invention, such as will enable others skilled in the art to which it pertains to make and use it, reference being had to the accompanying drawing, which forms part of this specification.

My invention relates to an improvement in lubricators for vehicles; and it consists in the combination of the tubular reservoir for holding the lubricant, a cup which is formed upon the outside of this reservoir, a tube which projects from the reservoir up into the cup to allow the displaced air to escape while filling the reservoir, and a tube for conveying the oil from the cup to the axle or shaft, as will be more fully described hereinafter.

The object of my invention is to provide a lubricator which can be permanently passed over the end of the axle and fastened upon the end of the hub, and which, when made to revolve, will automatically feed oil through the hub or pulley to the axle or shaft to which the lubricator is applied.

The accompanying drawing represents a vertical section of a lubricator embodying my invention.

A represents a tubular reservoir for holding the lubricant, and which is provided with a flange, B, at its inner end, for the purpose of catching over and being fastened to the inner end of the hub or other revolving body to which it is applied. This reservoir takes the place of the sand-band upon the inner end of the hub, or can be passed directly over the end of the band which has been already applied, as may be desired. Upon the inner end of this reservoir, and extending from the outside of the flange, is formed the cup C, which is provided with an oil-tight cap, D. Through the side of the reservoir, at the bottom of this cup, is made an opening, *a*, through which the lubricant flows into the reservoir while the reservoir is being filled, and through which the lubricant flows out again when the wheel is made to revolve, for the purpose of feeding the lubricant to the spindle, axle, or shaft. In order to allow the air which is displaced by the inflowing oil to escape from the reservoir, a tube, H, is provided, which extends outward nearly to the top of the cup. From this tube the air freely escapes while the oil or other lubricant is being poured into the reservoir. Extending from the bottom of the cup through the flange to the spindle, axle, or shaft is a tube, I, through which the oil escapes from the cup and flows to the place which is to be lubricated. After the lubricator has been placed upon the end of the hub, a hole may be bored down through the hub and this tube then inserted. It is not absolutely necessary that this tube should be used; but it will be found preferable in many instances, and it assists in holding the lubricator in position upon the end of the hub. Cotton-batting or other material is placed in the cup to regulate the flow of the oil. The cup C may be sunken under the flange B, if so desired, instead of being made to project beyond it, as here shown.

This lubricator can also be applied to loose pulleys and other similar places where a lubricant is needed.

Having thus described my invention, I claim—

A tubular reservoir provided with a flange, B, upon its inner end, the cup which is formed upon the outer side of the reservoir, a tube for the escape of air, and a tube for conducting the oil to the place to be lubricated, there being a hole through the side of the reservoir, inside of the cup, through which the lubricant passes, substantially as described.

In testimony whereof I affix my signature in presence of two witnesses.

EUGENE HENRY BELDEN.

Witnesses:
 JOSIAH B. FROST,
 WILLIAM T. GIBSON.